United States Patent
Fiquet

(10) Patent No.: US 11,529,981 B2
(45) Date of Patent: Dec. 20, 2022

(54) ULTRA-WIDEBAND BASED VITAL TRAIN TRACKING

(71) Applicant: Siemens Mobility, Inc., New York, NY (US)

(72) Inventor: Bruno Fiquet, Hoboken, NJ (US)

(73) Assignee: Siemens Mobility, Inc., New York, NY (US)

(*) Notice: Subject to any disclaimer, the term of this patent is extended or adjusted under 35 U.S.C. 154(b) by 478 days.

(21) Appl. No.: 16/778,595

(22) Filed: Jan. 31, 2020

(65) Prior Publication Data

US 2021/0237787 A1  Aug. 5, 2021

(51) Int. Cl.
   *B61L 25/04*   (2006.01)
   *H04B 1/7163*  (2011.01)
   *B61L 25/02*   (2006.01)

(52) U.S. Cl.
   CPC ............ *B61L 25/04* (2013.01); *B61L 25/025* (2013.01); *H04B 1/7163* (2013.01)

(58) Field of Classification Search
   CPC . B61L 3/12; B61L 25/04; B61L 23/06; H04B 1/7163; G01S 13/0209; G01S 13/04
   See application file for complete search history.

(56) References Cited

U.S. PATENT DOCUMENTS

| | | | |
|---|---|---|---|
| 7,725,252 B2 | 5/2010 | Heddebaut et al. | |
| 9,151,692 B2 | 10/2015 | Breed | |
| 10,435,053 B2 | 10/2019 | Bresson et al. | |
| 2019/0308643 A1 | 10/2019 | Liu | |
| 2019/0337545 A1 | 11/2019 | Carlson et al. | |
| 2020/0317235 A1* | 10/2020 | Carlson | B61L 27/20 |
| 2021/0046961 A1* | 2/2021 | Whittemore | G01S 13/765 |
| 2021/0114634 A1* | 4/2021 | Green | B61L 3/125 |

FOREIGN PATENT DOCUMENTS

| | | |
|---|---|---|
| AU | 6527794 A | 10/1994 |
| WO | 2012125726 A1 | 9/2012 |
| WO | 2019055281 A2 | 3/2019 |

* cited by examiner

*Primary Examiner* — Iqbal Zaidi

(57) ABSTRACT

Examples of techniques for vital train tracking using an ultra-wideband ranging system are disclosed. The system includes a train disposed on a track, the train having at least two onboard UWB beacons configured to broadcast a unique beacon identification number. The system also includes a plurality of wayside UWB beacons disposed along the track, a subset of the plurality of wayside UWB beacons being connected to a wayside communications network, wherein at least two of the plurality of wayside UWB beacons are configured to receive the unique beacon identification number. The system also includes a central computer in communication with the wayside communications network, wherein the central computer is configured to determine a position of the train on the track based at least in part upon known location of the at least two wayside UWB beacons.

15 Claims, 4 Drawing Sheets

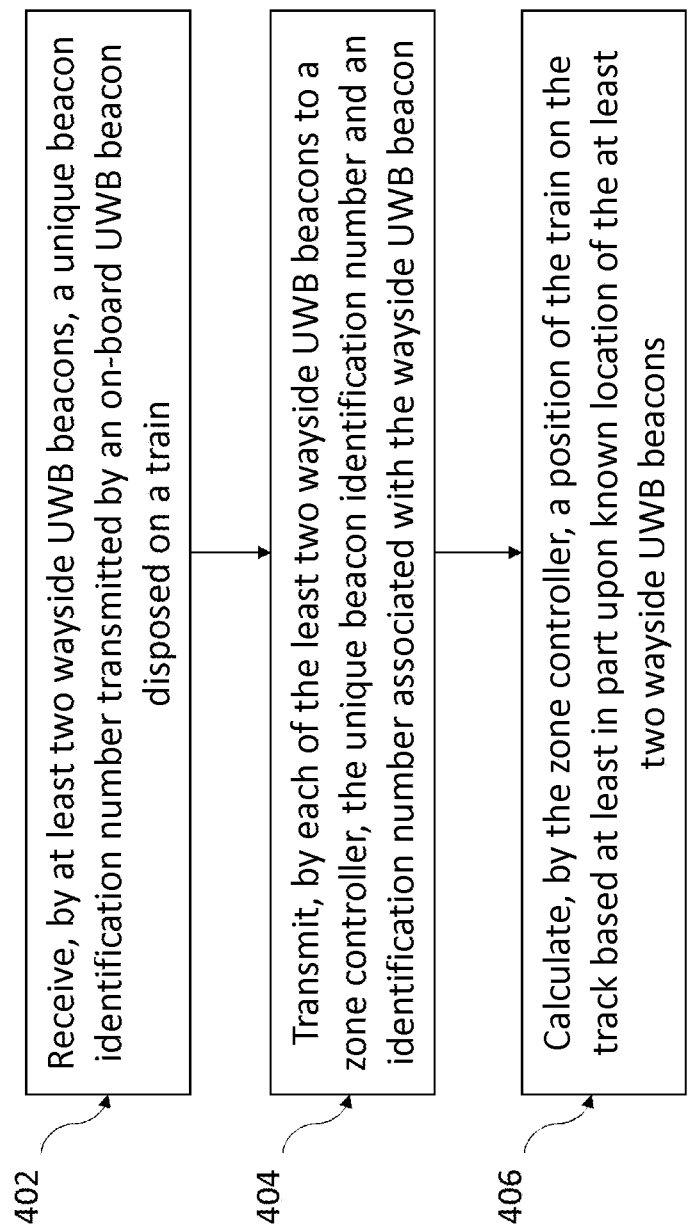

ULTRA-WIDEBAND BASED VITAL TRAIN TRACKING

BACKGROUND

The present invention generally relates to train tracking systems, and more specifically, to a system for vital train tracking using an ultra-wideband (UWB) ranging system.

Even the most advanced train control system such as CBTC (Communication Based Train Control) relies on a vital physical Track Vacancy Detection (TVD) system such as track-circuits or axle counters. Track vacancy detection equipment is required to operate a transit system safely and with minimum operational impacts when trains without onboard train protection systems, such as work trains, or trains with a failed onboard train protection system are operating on a revenue service track. Conventional track vacancy detection equipment is expensive to install and maintain at least in part due to the fact that it requires a significant amount of cables and track work and is prone to failures.

SUMMARY

Embodiments of the present invention are directed by a system for vital train tracking using an ultra-wideband ranging system. The system includes a train disposed on a track, the train having at least two onboard UWB beacons configured to broadcast a unique beacon identification number. The system also includes a plurality of wayside UWB beacons disposed along the track, a subset of the plurality of wayside UWB beacons being connected to a wayside communications network, wherein at least two of the plurality of wayside UWB beacons are configured to receive the unique beacon identification number. The system also includes a central computer in communication with the wayside communications network, wherein the central computer is configured to determine a position of the train on the track based at least in part upon known location of the at least two wayside UWB beacons.

Embodiments of the present invention are directed by a computer-implemented method for vital train tracking using an ultra-wideband ranging system. An example of the computer-implemented method includes receiving, by at least two wayside UWB beacons, a unique beacon identification number transmitted by an onboard UWB beacon disposed on a train. The method also includes transmitting, by each of the at least two wayside UWB beacons to a central computer, the unique beacon identification number and an identification number associated with the wayside UWB beacon and calculating, by the central computer, a position of the train on the track based at least in part upon known location of the at least two wayside UWB beacons.

Embodiments of the present invention are directed by a computer program product for vital train tracking using an ultra-wideband ranging system. The computer program product being on a computer readable storage medium having program instructions embodied therewith, the program instructions executable by a processing device to cause the processing device to perform a method. The method includes receiving, by at least two wayside UWB beacons, a unique beacon identification number transmitted by an onboard UWB beacon disposed on a train. The method also includes transmitting, by each of the at least two wayside UWB beacons to a central computer, the unique beacon identification number and an identification number associated with the wayside UWB beacon and calculating, by the central computer, a position of the train on the track based at least in part upon known location of the at least two wayside UWB beacons.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a flow diagram of a method for vital train tracking using an ultra-wideband ranging system according to one or more embodiments described herein.

The diagrams depicted herein are illustrative. There can be many variations to the diagrams or the operations described therein without departing from the spirit of the invention.

DETAILED DESCRIPTION

Turning now to an overview of the aspects of the invention, one or more embodiments of the invention address the above-described shortcomings of the prior art by providing vital train tracking using an ultra-wideband ranging system. In exemplary embodiments, a system for tracking and controlling trains is provided which minimizes the need for conventional track vacancy detection (TVD) equipment. The vital train tracking system includes a plurality of wayside ultra-wideband (UWB) beacons that include one or more UWB beacons which are connected to a wayside communication network (WCN). In addition, the vital train tracking system includes onboard UWB beacons mounted on a train, or other work equipment, to be tracked. In exemplary embodiments, the onboard UWB beacons are configured to transmit information that is received by multiple of the plurality of wayside UWB beacons and relayed to a central computer.

The central computer is a computer system in communication with the WCN that is configured to calculate the location of a train based on the UWB signals received by the wayside UWB beacons. The central computer is configured to orchestrate the operation of the trains on tracks within its area, or zone, of control. In one embodiment, the central computer communicates with an onboard controller disposed on a train over the WCN and UWB beacons communications. The central computer provides the onboard controller with a movement authority limit, a speed limit, etc. In exemplary embodiments, the central computer is used for other functions of the train control system.

In general, UWB beacons are well known in the art. Ultra-wideband (UWB) is a radio frequency communication technology that uses a very low energy level for short-range, high-bandwidth communications over a large portion of the radio spectrum, i.e., greater than five-hundred MHz. UWB is well-suited for use in real-time location systems and has been used in precision radar-imaging technology, precision locating and tracking (using distance measurements between radios—often referred to as UWB ranging), and precision time-of-arrival-based localization approaches. In exemplary embodiments, the effective range of a UWB beacon of the UWB ranging system is approximately 300 m to 500 m.

Figure 1:
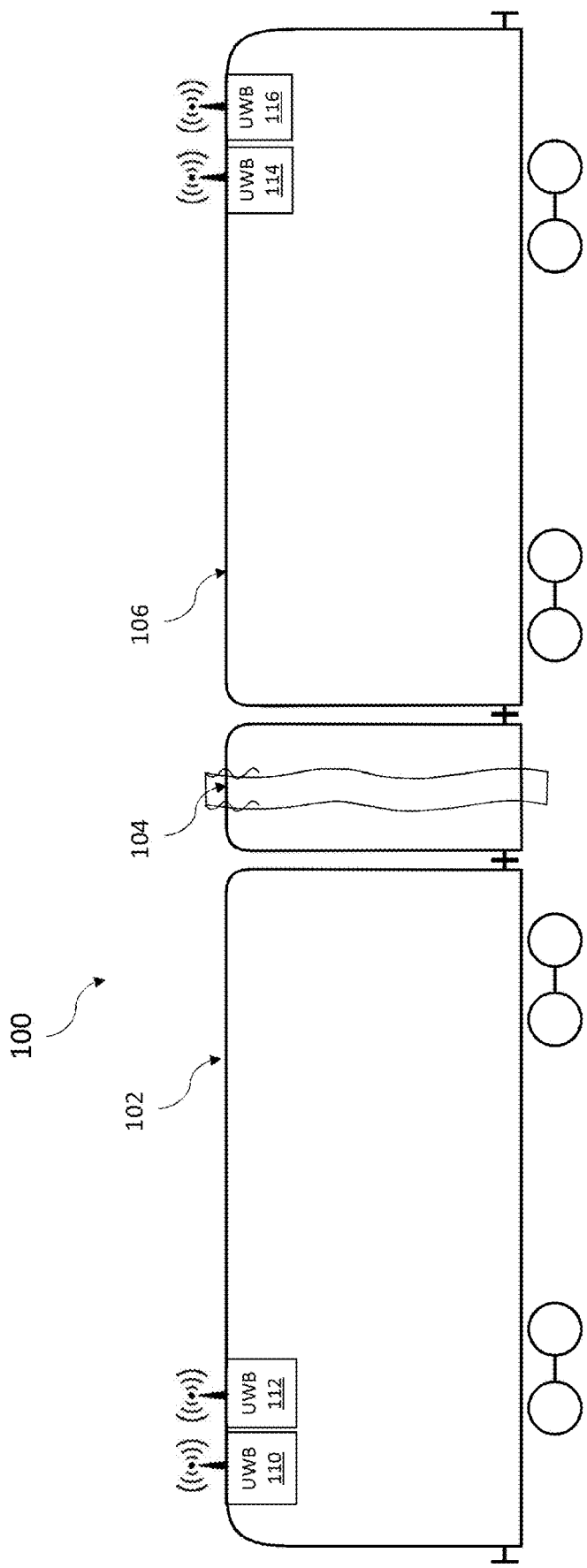
FIG. 1 depicts a schematic diagram of a train for use in a vital train tracking system using an ultra-wideband ranging system according to one or more embodiments described herein.

Referring now to FIG. 1, a train 100 for use in a vital train tracking system using an ultra-wideband ranging system according to one or more embodiments is shown. As illustrated, the train 100 includes a train car 102 disposed at a first end of the train 100, a train car 106 disposed at an opposing end of the train 100, and one or more intervening train cars 104. In exemplary embodiments, each of the train cars 102, 104, and 106 are coupled to one another via an onboard network 108. In exemplary embodiments, the train car 102 includes two onboard UWB beacons 110, 112 and the train car 106 also includes two onboard UWB beacons 114, 116.

Figure 2:
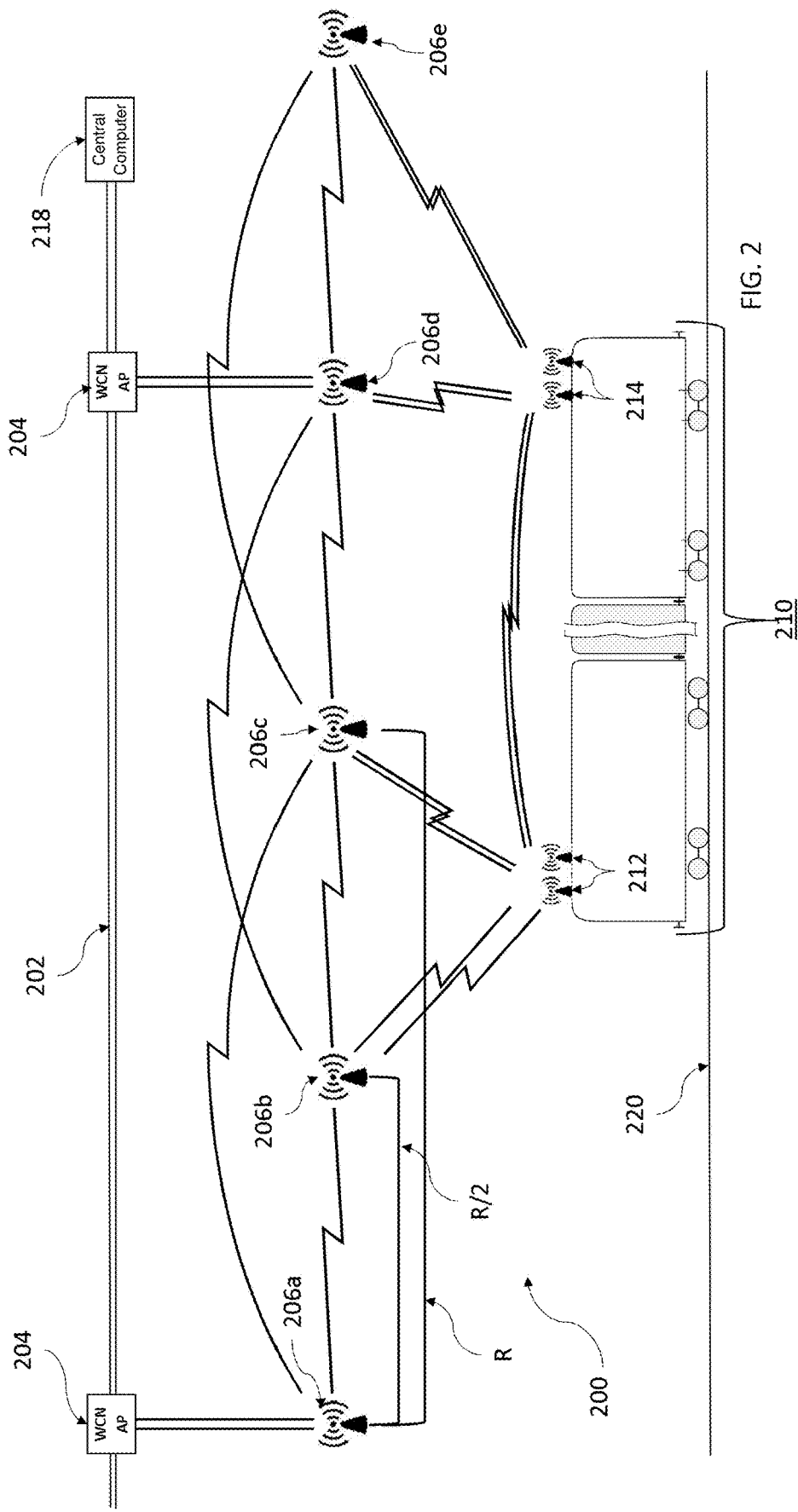
FIG. 2 depicts a schematic diagram of a vital train tracking system using an ultra-wideband ranging system according to one or more embodiments described herein.

Referring now to FIG. 2, a schematic diagram of a vital train tracking system 200 using an ultra-wideband ranging system according to one or more embodiments is shown. As illustrated, the system 200 includes a plurality of wayside UWB beacons 206a, 206b, 206c, 206d, and 206e, disposed along a train track 220. The effective range of a UWB beacon is shown as R, which is up to 500 m. The UWB beacons are disposed at a distance of not greater than R/2 from each other depending of the track configuration. As a result, each of the plurality of wayside UWB beacons 206a, 206b, 206c, 206d, and 206e are disposed such that each wayside UWB beacon can communicate with four neighboring wayside UWB beacons. For example, wayside UWB beacon 206c is within the communication range of wayside UWB beacons 206a, 206b, 206d, and 206e. In addition, each of the plurality of wayside UWB beacons 206a, 206b, 206c, 206d, and 206e are located close enough from each other and from the train track 220, such that two wayside UWB beacons are always within communications range of an onboard UWB beacon 212, 214 mounted on a train 210.

In exemplary embodiments, a subset of the plurality of wayside UWB beacons are connected to a wayside communication network (WCN) 202 by WCN access points 204. The subset of the plurality of wayside UWB beacons are connected to the WCN 202 are selected such that each wayside UWB beacon not connected to the WCN 202 can directly wireless communicate with at least two wayside UWB beacons connected to the WCN 202. The WCN 202 includes a central computer 218 that is configured to, among other things, track the presence and location of train 210 on the train track 220 within a geographical zone. The train 210, or other work equipment, is tracked by the central computer 218 based on ranging information acquired by the plurality of wayside UWB beacons 206a, 206b, 206c, 206d, and 206e. In exemplary embodiments, the locations of each of the plurality of wayside UWB beacons 206a, 206b, 206c, 206d, and 206e is known by the central computer 218 and the difference in the time of arrival of data received from the onboard UWB beacons 212, 214 by the various wayside UWB beacons is used to calculate the position of the train 210. In other embodiments, other known UWB ranging techniques can be used to calculate the position of the train relative to the wayside UWB beacons. In exemplary embodiments, the position of the beginning and end of the train 210 and the speed of the train 210 are also calculated by the central computer 218 based on the received UWB ranging data.

In exemplary embodiments, the vital train tracking system 200 is configured to have high fault tolerance, such that the failure of one or more wayside UWB beacons 206 will not interrupt the function of the system 200. As illustrated, each of the wayside UWB beacons 206 are in communications range with at least four additional wayside UWB beacons 206. In exemplary embodiments, each wayside UWB beacon 206b, 206c, 206e that is not physically connected to the WCN 202 is within communications range of two wayside UWB beacons 206a, 206d that are connected to the WCN 202. In addition, the wayside UWB beacons 206 are disposed such that at least two wayside UWB beacons 206 are within communications range of an onboard UWB beacon 212, 214. As a result, the failure of any single wayside UWB beacon 206, will not impact on the operation of the system 200. Furthermore, since the train cars at either end of the train 210 include at least two onboard UWB beacons 212, 214, the failure of a single onboard UWB beacon 212, 214 will not impact on the operation of the system 200.

For example, in the illustration shown, if wayside UWB beacon 206c fails, the vital train tracking system 200 is still able to obtain UWB ranging data and UWB communications between onboard UWB beacon 212 and wayside UWB beacon 206b. In another example, if wayside UWB beacon 206d fails, the vital train tracking system 200 is still able to obtain UWB ranging data and UWB communications between onboard UWB beacon 214 and wayside UWB beacon 206e. Furthermore, wayside UWB beacon 206e is able to maintain a communications link to the central computer via multi-hop communications using the remaining wayside UWB beacons 206c and 206a, or through a single hop communication with another UWB beacons disposed to on the opposite side of wayside UWB beacon 206e.

In exemplary embodiments, the tracking of trains and equipment is not based exclusively on the UWB beacons and UWB ranging because the UWB beacon system cannot detect a train or equipment which is not equipped with UWB beacons or which UWB beacons are failed and not emitting. In exemplary embodiments, a vital train tracking system is provided that includes both an ultra-wideband ranging system and a limited amount of track vacancy detection equipment that is used to detect the entry of trains and equipment onto the track controlled by a central computer. In these embodiments, a central computer is configured to communicate with track vacancy detection equipment that detects the entry of a train onto a segment of track and central computer uses the UWB ranging system to track the location of the train on the segment of the track. In the event that the train does not have an onboard UWB beacon, or if the onboard UWB beacon has failed, the central computer will be able to determine that a train has entered the segment of the track using the track vacancy detection equipment. In exemplary embodiments, when a train is detected entering the segment of track by the track vacancy detection equipment and the train is not detected by the UWB ranging system, the central controller marks the entire section of track as occupied until the track vacancy detection equipment detects the train leave the segment of track.

Figure 3:
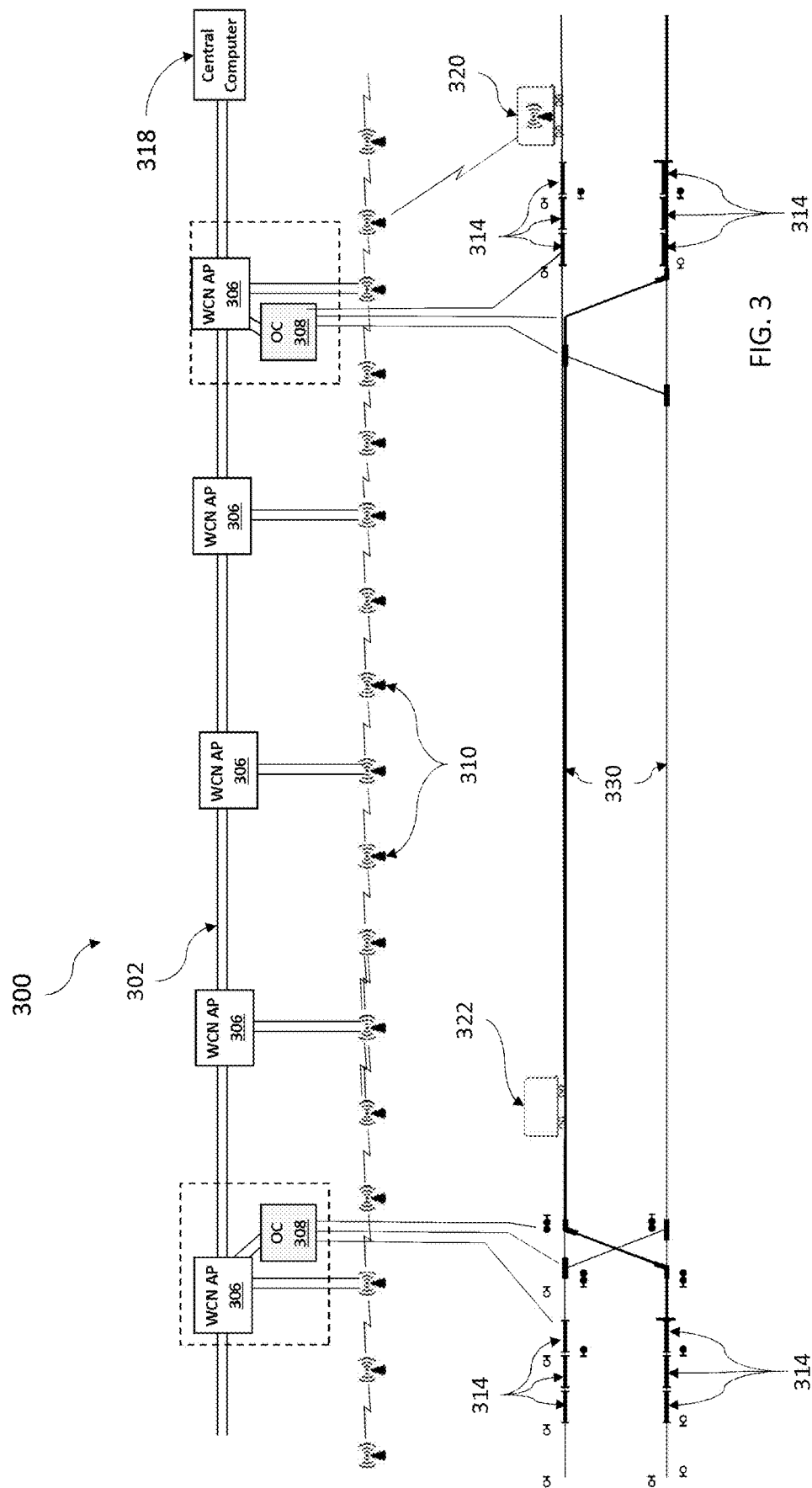
FIG. 3 depicts a schematic diagram of a vital train tracking system using an ultra-wideband ranging system and track vacancy detection equipment according to one or more embodiments described herein.

Referring now to FIG. 3, a schematic diagram of a vital train tracking system 300 having both an ultra-wideband ranging system and track vacancy detection equipment according to one or more embodiments is shown. In general, the system 300 is similar to system 200 shown in FIG. 2 and described above. However, the system 300 further includes track vacancy detection (TVD) equipment 314, such as an axle counting system or track circuits, disposed along the tracks 330. In an exemplary embodiment, the TVD equipment 314 is located only at an entry point to each zone, or territory.

As illustrated, the vital train tracking system 300 includes a plurality of wayside UWB beacons 310 that are disposed along tracks 330. One or more of the plurality of wayside UWB beacons 310 are coupled to a wayside communications network (WCN) 302 by WCN access points 306. In addition, system 300 includes object controllers 308 that are in communication with the TVD equipment 314. The system 300 further includes a central computer 318 in communication with the WCN 302. In exemplary embodiments, the system 300 is configured to use the TVD equipment 314 to detect the entry of a non-UWB emitting train 322, or work equipment, on track 330. In addition, the system 300 is configured to use the plurality of wayside UWB beacons 310 to calculate and track a position of a UWB emitting train 320.

In exemplary embodiments, a train includes a plurality of train cars, such as shown in FIG. 1, and both the first train car and the last train car include UWB beacons. Trains that are subject to loss of integrity, also referred to as a train split, are equipped with two pairs of onboard UWB sensors and protection against loss of integrity is performed by the central computer by tracking both pairs of onboard UWB sensors. In the event of a train split then the central computer will continue to detect the location of each remaining part of the train.

Referring now to FIG. 4, a flowchart diagram of a method for vital train tracking using an ultra-wideband ranging system in accordance with one or more embodiments is shown. As shown at block 402, the method includes receiving, by at least two wayside UWB beacons, a unique beacon identification number transmitted by an onboard UWB beacon disposed on a train. In exemplary embodiments, the least two wayside UWB beacons are part of a plurality of wayside UWB beacons disposed along the track and wherein a subset of the plurality of wayside UWB beacons are connected to a wayside communications network. Next, as shown at block 404, the method includes transmitting, by each of the least two wayside UWB beacons to a central computer, the unique beacon identification number and an identification number associated with the wayside UWB beacon. The method also includes calculating, by the central computer, a position of the train on the track based at least in part upon known location of the at least two wayside UWB beacons, as shown at block 406. In exemplary embodiments, the central computer includes a database of the locations of each wayside UWB beacon and the identification number associated with the wayside UWB beacon.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system for vital train tracking using ultra-wideband (UWB) beacons, the system comprising:
    a train disposed on a track, the train having at least two onboard UWB beacons configured to broadcast a unique beacon identification number;
    a plurality of wayside UWB beacons disposed along the track, a subset of the plurality of wayside UWB beacons being connected to a wayside communications network, wherein at least two of the plurality of wayside UWB beacons are configured to receive the unique beacon identification number; and
    a central computer in communication with the wayside communications network, wherein the central computer is configured to determine a position of the train on the track based at least in part upon known location of the at least two wayside UWB beacons,
    wherein the train includes a first car that includes the at least two onboard UWB beacons and a second car that includes two additional onboard UWB beacons, wherein the first car is disposed on one end of the train and the second car is disposed on an opposing end of the train.

2. The system of claim 1, wherein each of the plurality of wayside UWB beacons not in the subset are located within a communications range of at least two of the plurality of wayside UWB beacons in the subset.

3. The system of claim 1, further comprising a track vacancy detection system disposed on the track, the track vacancy detection system in communication with the central computer.

4. The system of claim 3, wherein the central computer is configured to detect a presence of the train on the track using both the track vacancy detection system and the plurality of wayside UWB beacons.

5. The system of claim 4, wherein the track is divided into a plurality of zones and wherein the track vacancy detection system consists of one or more sensors disposed only at an entry point into each of the plurality of zones.

6. A method for vital train tracking using ultra-wideband (UWB) beacons, the method comprising:
    receiving, by at least two wayside UWB beacons, a unique beacon identification number transmitted by an onboard UWB beacon disposed on a train;
    transmitting, by each of the at least two wayside UWB beacons to a central computer, the unique beacon identification number and an identification number associated with the wayside UWB beacon;
    calculating, by the central computer, a position of the train on the track based at least in part upon known location of the at least two wayside UWB beacons, and
    receiving, by the central computer, a signal from a track vacancy detection equipment disposed on the track indicating a presence of the train on the track, wherein the central computer is configured to detect a presence of the train on the track using both the track vacancy detection equipment and the at least two wayside UWB beacons.

7. The method of claim 6, wherein the least two wayside UWB beacons are part of a plurality of wayside UWB beacons disposed along the track and wherein a subset of the plurality of wayside UWB beacons are connected to a wayside communications network.

8. The method of claim 7, wherein each of the plurality of wayside UWB beacons not in the subset are located within a communications range of at least two of the plurality of wayside UWB beacons in the subset.

9. The method of claim 6, wherein the train includes a first car that includes at least two onboard UWB beacons and a second car that includes two additional onboard UWB beacons, wherein the first car is disposed on one end of the train and the second car is disposed on an opposing end of the train.

10. The method of claim 6, wherein the track is divided into a plurality of zones and wherein the track vacancy detection system consists of one or more sensors disposed only at an entry point into each of the plurality of zones.

11. A non-transitory computer readable storage medium for vital train tracking using ultra-wideband beacons, the computer readable storage medium having program instructions embodied therewith, the program instructions executable by a processing device to cause the processing device to perform a method comprising:
    receiving, by at least two wayside UWB beacons, a unique beacon identification number transmitted by an onboard UWB beacon disposed on a train;
    transmitting, by each of the at least two wayside UWB beacons to a central computer, the unique beacon identification number and an identification number associated with the wayside UWB beacon;
    calculating, by the central computer, a position of the train on the track based at least in part upon known location of the at least two wayside UWB beacons, and
    receiving, by the central computer, a signal from a track vacancy detection equipment disposed on the track indicating a presence of the train on the track, wherein the central computer is configured to detect a presence of the train on the track using both the track vacancy detection equipment and the at least two wayside UWB beacons.

12. The computer program product of claim 11, wherein the least two wayside UWB beacons are part of a plurality of wayside UWB beacons disposed along the track and wherein a subset of the plurality of wayside UWB beacons are connected to a wayside communications network.

13. The computer program product of claim 12, wherein each of the plurality of wayside UWB beacons not in the subset are located within a communications range of at least two of the plurality of wayside UWB beacons in the subset.

14. The computer program product of claim 11, wherein the train includes a first car that includes at least two onboard UWB beacons and a second car that includes two additional onboard UWB beacons, wherein the first car is disposed on one end of the train and the second car is disposed on an opposing end of the train.

15. The computer program product of claim 11, wherein the track is divided into a plurality of zones and wherein the track vacancy detection system consists of one or more sensors disposed only at an entry point into each of the plurality of zones.

\* \* \* \* \*